United States Patent
Bauer et al.

(10) Patent No.: US 8,888,624 B2
(45) Date of Patent: Nov. 18, 2014

(54) TENSIONING DEVICE WITH AN UNLOCKING ELEMENT HAVING A RAMP SECTION

(71) Applicant: IWIS Motorsysteme GmbH & Co., KG, Munich (DE)

(72) Inventors: Christian Bauer, Munich (DE); Tobias Schmid, Bronnen (DE)

(73) Assignee: IWIS Motorsysteme GmbH & Co., KG, Munich (DE)

( * ) Notice: Subject to any disclaimer, the term of this patent is extended or adjusted under 35 U.S.C. 154(b) by 0 days.

(21) Appl. No.: 13/744,263

(22) Filed: Jan. 17, 2013

(65) Prior Publication Data

US 2013/0190117 A1    Jul. 25, 2013

(30) Foreign Application Priority Data

Jan. 20, 2012   (DE) .................. 10 2012 001 074

(51) Int. Cl.
  *F16H 7/08*   (2006.01)
  *F16H 7/22*   (2006.01)
(52) U.S. Cl.
  CPC .......... *F16H 7/08* (2013.01); *F16H 2007/0855* (2013.01); *F16H 7/0848* (2013.01); *F16H 2007/0878* (2013.01); *F16H 2007/0806* (2013.01)
  USPC ...................................................... 474/110
(58) Field of Classification Search
  CPC .......... F16H 7/0848; F16H 2007/0806; F16H 2007/0812; F16H 2007/0855; F16H 2007/0891
  USPC ...................................................... 474/110
  See application file for complete search history.

(56) References Cited

U.S. PATENT DOCUMENTS

| | | | | | |
|---|---|---|---|---|---|
| 4,792,322 | A | * | 12/1988 | Goppelt et al. | 474/136 |
| 5,931,754 | A | * | 8/1999 | Stief et al. | 474/109 |
| 5,989,139 | A | * | 11/1999 | Dusinberre et al. | 474/110 |
| 6,120,402 | A | * | 9/2000 | Preston et al. | 474/109 |
| 6,126,563 | A | * | 10/2000 | Simpson | 474/110 |
| 6,244,981 | B1 | * | 6/2001 | Simpson | 474/110 |
| 6,435,992 | B2 | * | 8/2002 | Wakabayashi et al. | 474/101 |
| 6,817,958 | B2 | * | 11/2004 | Kaido et al. | 474/101 |
| 6,916,264 | B2 | * | 7/2005 | Hashimoto et al. | 474/109 |

(Continued)

FOREIGN PATENT DOCUMENTS

| DE | 69810836 T2 | 6/2003 |
|---|---|---|
| DE | 202007008985 U1 | 12/2008 |

(Continued)

*Primary Examiner* — Henry Liu
(74) *Attorney, Agent, or Firm* — Baker Hostetler LLP

(57) ABSTRACT

A tensioning device is provided for an endless drive device, having a housing, a spring-loadable tensioning piston in a piston bore of the housing, a transport locking device, and a device to adjust the working range of the tensioning piston with a retainer element on the housing having at least one spring arm and a retainer profile arranged in the forward section of the tensioning piston in the tensioning direction. The transport locking device comprises a transport groove in the tensioning piston, the spring arm of the retainer element being engageable into the transport groove, and an unlocking element, wherein the unlocking element has at least one ramp section potentially in functional contact with the spring arm. The ramp section exerts an unlocking force on the spring arm over a travel path of the unlocking element relative to the tensioning piston, forcing said spring arm out of the transport groove.

7 Claims, 21 Drawing Sheets

(56) References Cited

U.S. PATENT DOCUMENTS

| | | | |
|---|---|---|---|
| 6,935,978 B2 * | 8/2005 | Hayakawa et al. | 474/109 |
| 7,189,174 B2 * | 3/2007 | Yamamoto et al. | 474/109 |
| 7,455,607 B2 * | 11/2008 | Narita et al. | 474/109 |
| 7,527,572 B2 * | 5/2009 | Sato et al. | 474/109 |
| 7,559,863 B2 * | 7/2009 | Onimaru et al. | 474/110 |
| 7,571,632 B2 * | 8/2009 | Yamamoto et al. | 72/370.21 |
| 7,677,999 B2 * | 3/2010 | Sato et al. | 474/109 |
| 7,775,921 B2 * | 8/2010 | Izutsu et al. | 474/110 |
| 8,257,212 B2 * | 9/2012 | Yoshimura et al. | 474/110 |
| 2003/0139235 A1 * | 7/2003 | Yamamoto et al. | 474/109 |
| 2004/0092348 A1 * | 5/2004 | Hashimoto et al. | 474/109 |
| 2004/0266571 A1 * | 12/2004 | Izutsu et al. | 474/110 |
| 2006/0094548 A1 * | 5/2006 | Sato et al. | 474/109 |
| 2006/0281595 A1 * | 12/2006 | Narita et al. | 474/109 |
| 2010/0016105 A1 * | 1/2010 | Yoshimura et al. | 474/110 |
| 2010/0222167 A1 * | 9/2010 | Chekansky et al. | 474/110 |
| 2011/0028253 A1 * | 2/2011 | Perissinotto | 474/135 |
| 2011/0183796 A1 * | 7/2011 | Kurematsu et al. | 474/110 |
| 2011/0195810 A1 * | 8/2011 | Perissinotto | 474/101 |
| 2012/0040790 A1 * | 2/2012 | Perissinotto et al. | 474/110 |

FOREIGN PATENT DOCUMENTS

| | | |
|---|---|---|
| DE | 102009035923 A1 | 2/2011 |
| EP | 1188955 A1 | 3/2002 |
| EP | 2395259 A1 | 12/2011 |
| EP | 2395260 A1 | 12/2011 |
| JP | 2001146946 A | 5/2001 |
| WO | 2009000354 A1 | 12/2008 |
| WO | 2009024196 A1 | 2/2009 |

* cited by examiner

TENSIONING DEVICE WITH AN UNLOCKING ELEMENT HAVING A RAMP SECTION

CROSS-REFERENCE TO RELATED APPLICATION

This application claims priority to foreign German patent application No. DE 102012001074.5, filed on Jan. 20, 2012, the disclosure of which is incorporated by reference in its entirety.

FIELD OF THE INVENTION

The present invention refers to a tensioning device for an endless drive device, such as a chain or belt, having a housing, a tensioning piston guided in a sliding manner against a spring in a piston bore of the housing, an adjustment device to adjust the working range of the tensioning piston, and a transport locking device, whereby the adjustment device comprises a retainer element arranged on the housing having at least one spring arm and a retainer profile arranged in the forward section of the tensioning piston in the tensioning direction.

BACKGROUND

Such a tensioning device is known from DE 10 2009 035923 A1, for instance. The tensioning piston is held in its retracted transport state by means of a transport locking device. In this transport state, a compression spring that is compressed under tension is located in a pressure reservoir and pushes against the tensioning piston. The transport locking device comprises a straight retainer pin, which engages into corresponding eyes on the housing of the chain tensioner and comes to rest on the tensioning piston with one shoulder, therefore preventing the tensioning piston from being deployed further. This design is a flange tensioner, which in this transport state is brought into its predetermined position on the engine block by means of corresponding fastening devices. After the fastening to the engine block, the retainer pin is pulled and the tensioning piston is deployed due to the spring force of the compression spring arranged in the pressure reservoir. A type of retainer clamp is seated in the front section of the housing, where said retainer clamp engages into a corresponding retainer profile on the exterior surface of the tensioning piston with its two opposing spring arms. The retainer clamp is designed in such manner that it fulfills several functions. The spring force pushes the tensioning piston out far enough against the push contact surface of a pivoting tensioning rail that a chain, which is in contact with this tensioning rail, is correspondingly tensioned. This is typically a timing chain of a timing chain drive for an internal combustion engine. The spring arms of the retainer clamp engage into one of the retainer grooves of the retainer profile, causing the retainer clamp now to come to rest on the tensioning piston and be able to move together with said tensioning piston. Because of correspondingly shaped pocket sections, the retainer clamp can move up and down relative to the housing over a defined working range. The housing has suitable protrusions that engage into these pocket sections of the retainer clamp, serving as upper or lower stops for the retainer clamp. The retainer clamp and the retainer profile are configured in such a way that while the tensioning piston can be deployed beyond the working range to accommodate wear related chain lengthening so that the retainer clamp can be brought into engagement with another retainer groove, it is no longer possible for the tensioning piston to be retracted beyond the working range. This results in an automatic adjustment of the working range depending on the wear state (lengthening) of the chain.

This known chain tensioner has the disadvantage that it can only be configured as a flange tensioner due to the transport locking device.

A tensioning device configured as a screw-in chain tensioner is described by WO 2009/024196 A1, for instance. This device is equipped with a reversibly, radially expandable locking sleeve that is attached on the front end of the housing. An arresting ring is arranged at the front end of the tensioning piston that is initially located outside of the locking sleeve. Activating the tensioning device exerts pressure on the tensioning piston, so that the arresting ring is inserted into the radially expandable locking sleeve, causing said locking sleeve to expand radially. The arresting ring's travel is afterward restricted to a predefined region within the locking sleeve. The arresting ring can then again travel from retainer groove to retainer groove on a retainer profile of the tensioning piston as a function of the chain lengthening; however this travel is only in one direction, with the ring locking in the other direction. This design has the disadvantage that it has no transport locking device and that the tensioning piston must be completely retracted before its first use, so that the arresting ring enters the locking sleeve. To do so, the tensioning piston must be retracted against the force of the compression spring, either during assembly or in the installed state. Due to the constrained space in the engine compartment, this activation of the adjustment function is frequently difficult.

SUMMARY OF THE INVENTION

It is therefore the object of the present invention to provide a tensioning device of the previously named type, which provides in an advantageous manner a transport locking device and also an adjustment device for screwed-in or inserted housings.

This object is attained according to the invention in that the transport locking device comprises a transport groove in the tensioning piston, the spring arm of the retainer element, where said spring arm can be engaged in the transport groove, and an unlocking element, and the unlocking element has at least one ramp section that can be brought into functional contact with the spring arm, where said ramp section exerts an unlocking force on the spring arm over a specified travel distance of the unlocking element relative to the tensioning piston, forcing the spring arm from the transport groove. This configuration precisely differentiates between the retainer profile, which provides for the adjustment of the working range in interaction with the spring arm, and a transport groove into which the spring arm engages without the tensioning piston being able to deploy. A suitably configured unlocking element then forces the spring arm from the transport groove, permitting the tensioning piston to deploy. Preferably, the unlocking element executes a guided path of motion, resulting in a defined interaction between the ramp section and the spring arm. Ideally, the unlocking element is connected with a moving element of the tensioning device, or configured as a unit with the tensioning device.

According to a favorable configuration, the unlocking element is equipped with an entrainment device that can be brought into functional contact with the tensioning piston to ensure that the at least one spring arm can be securely engaged with the retainer profile after the unlocking process, where said entrainment device is configured and positioned in such a manner that the entrainment device is brought into functional contact with the deploying tensioning piston after the spring arm is disengaged from the transport groove, the tensioning piston carries the unlocking element along, and the ramp section is therefore brought out of functional contact with the spring arm of the retainer element and engages into the retainer profile. Due to the spring force, the deploying tensioning piston thus again forces the ramp section out of engagement with the spring arm, so that the spring arm again moves toward the tensioning piston and can engage into the retainer profile. This process is non-critical because the spring arm by itself cannot prevent the deployment of the tensioning piston in the interaction between the spring arm and the retainer profile, but this is instead achieved by the pressing onto the tensioning rail, which is in contact with the chain.

For reasons of safety and improved provision of function, it is advantageous according to one version for the retainer element to have two opposing spring arms that function as a type of clamp, and the unlocking element to have a chevron type ramp section that can be inserted between the two spring arms, causing the spring arms to be spread apart and to be disengaged from the transport groove. The tensioning piston is accordingly encompassed by the unlocking element in a clamp-like manner. When the spring arms are in contact with the tensioning piston it is not mandatory that these continue to exert a force. However, a corresponding spring force is required to move the spring arms to the outside, away from the tensioning piston, where said spring force is required for the unlocking or adjustment processes. The ramp sections accordingly point away from each other in such a manner that they can be inserted between the two spring arms and force these away from each other, causing the retainer element to be spread apart. This process causes the two spring arms to glide out of the transport groove.

A particularly simple configuration forms the retainer element from a bent round wire clamp, the spring arms of which are attached by means of stop tabs that encompass the housing at least in sections, where said stop tabs can be brought into functional contact with stop protrusions on the housing in order to adjust the working range. These stop tabs, which are preferably formed as a single part from the round wire, therefore constitute the stop for the continued upward travel of the retainer element. During the adjustment process the tensioning piston is forced further from the housing, whereas the retainer element contacts the stop protrusions with the stop tabs and is prevented from traveling further. Due to the retainer profile, this in turn results in a spreading apart of the at least one spring arm, whereby said spring arm can engage into another location of the retainer profile.

Ideally, another version provides that the spring arms, which are engaged with the retainer profile, protrude radially in such a manner that the spring arms can be brought into contact with stop surfaces on the housing on the retracting end of the working range when the tensioning piston is retracted in order to prevent a further retraction of the tensioning piston. The interaction between the stop surfaces and the radially protruding spring arms causes a blockage of the retraction travel of the tensioning piston. This can require a corresponding shape of the stop surfaces (e.g. in the shape of a cone, etc.), causing the at least one spring arm to be forced more strongly in the direction of the tensioning piston. The retainer profile can also be configured in such a manner that a gliding out of the at least one spring arm from the retainer profile is not possible when contacting the stop surface.

According to a preferred embodiment, the tensioning device comprises a tensioning rail, whereby the unlocking element is arranged on the tensioning rail. The retainer element therefore interacts with an unlocking element on the tensioning rail. An unlocking accordingly can only occur when these two elements interact with each other. This generally occurs during the assembly process, in that the retainer element moves toward the tensioning rail, or the tensioning rail is pivoted in the direction of the retainer element.

In an advantageous arrangement, the entrainment device can be formed by the push contact surface of the tensioning rail, which comes into functional contact with a front face of the tensioning piston. First, the unlocking element therefore comes into contact with the retainer element and disengages the at least one spring arm, causing the tensioning piston to propel from the housing due to the spring force. After a generally short travel, the front face of the tensioning piston then impacts the push contact surface of the tensioning rail, and subsequently causes a pivoting motion of the tensioning rail until the chain is adequately tensioned. Because this causes the tensioning piston to also be deployed further and the tensioning rail to be pivoted back, the unlocking element is also disengaged from the retainer element, causing the spring arm to spring back and to engage with the retainer profile.

A further configuration provides that the unlocking element is arranged such that it can slide in the tensioning direction in the front section of the tensioning piston and opposite to the tensioning direction relative to the tensioning piston. The unlocking element is therefore guided by the tensioning piston itself and comes to rest on said tensioning piston, and is correspondingly arranged such that it can slide for the unlocking process. Because of this measure, no special designs must be arranged on other components, such as the tensioning rail. All elements necessary for the unlocking and adjustment functions are therefore combined into a single sub-assembly.

Preferably, the unlocking element can be ring-shaped in design and be mated on the front terminating section of the tensioning piston and be secured by means of at least one retainer tab that engages on the tensioning piston. Due to the retainer tab, certain positions of the unlocking element can be specified along the terminating section of the tensioning piston. Position specifications for the unlocking element can accordingly be made before and also after the unlocking process.

In connection with this, it is advantageous if the at least one retainer tab engages into the transport groove in a transport state, and the unlocking element protrudes past the terminating section of the tensioning piston in this transport state. This causes the unlocking element to first come into contact with the tensioning rail before the tensioning piston contacts the tensioning rail. Pushing the unlocking element onto the tensioning rail can therefore be employed for unlocking purposes.

Moreover, the unlocking element can have at least one spreader arm that protrudes in a direction parallel to the axis opposite to the tensioning direction of the tensioning piston, where the at least one ramp section and/or the at least one retainer tab is arranged on said spreader arm. When the unlocking element slides in the axial direction, this spreader arm can then force the at least one spring arm away from the tensioning piston, so that said tensioning piston comes out from the unlocking groove. At the same time, or alternatively, the spreader arm can also have the at least one retainer tab, so that the starting position of the unlocking element and/or also the terminating position is secured on the tensioning piston after the unlocking process.

One version correspondingly provides that the at least one retainer tab is configured and positioned in such a manner that after an unlocking and relative sliding of the tensioning piston, the at least one retainer tab engages into the retainer profile, securing the unlocking element in this unlocked state.

Preferably, the overall height of the unlocking element and the position of the at least one retainer tab can be selected in such a manner that the tensioning piston protrudes from the unlocking element in the unlocked state. This ensures that in normal operation of the tensioning device, the unlocking element is secured in a position on the tensioning piston that renders it essentially without function, and where said unlocking element preferably has no contact with the tensioning rail.

According to one version, the entrainment device can ideally be formed by a stop shoulder arranged in the ring-shaped unlocking element, where said stop shoulder comes into contact with a stop on the tensioning piston, so that the unlocking element can move together with the deploying tensioning piston and can be disengaged from the retainer element.

According to one configuration, the retainer profile is formed by ring grooves arranged adjacent to each other below the transport groove, whereby the retainer tab in the unlocked state engages into the ring groove that is physically closest to the transport groove. This makes further measures on the tensioning piston unnecessary to secure the unlocking element in the unlocked state on the tensioning piston, but instead permits the use of already existing structures.

Moreover, the invention refers to a chain drive, in particular a timing or auxiliary device drive of an internal combustion engine, having a drive chain sprocket, at least one driven chain sprocket, a drive chain that couples the drive chain sprocket and the at least one driven chain sprocket to each other, and a tensioning device in accordance with one of the claims 1 to 14 that tensions the drive chain.

BRIEF DESCRIPTION OF THE DRAWINGS

The following provides a more detailed, drawing-based discussion of embodiments of the present invention. Shown are:

FIG. 1 to 8 will now be employed to provide a more detailed discussion of a first embodiment of a tensioning device according to the invention as follows.

DETAILED DESCRIPTION

Figure 1:
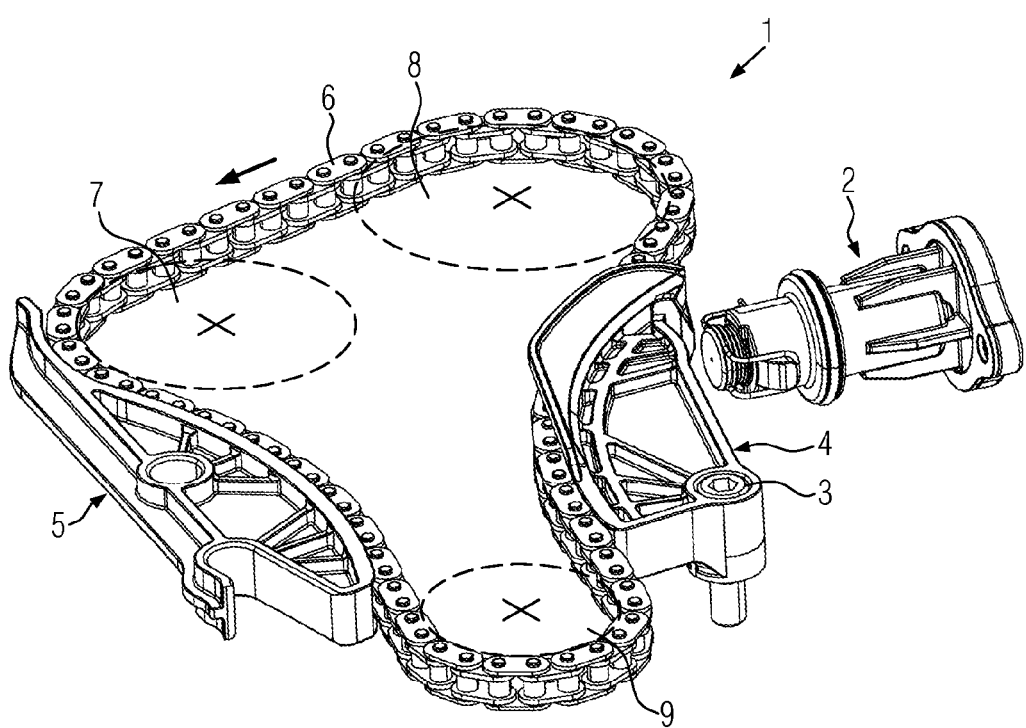
FIG. 1 a perspective schematic representation of a timing chain drive in accordance with a first embodiment, FIG. 2 a schematic side view of the tensioning device from FIG. 1 in the installation state before the unlocking, FIG. 3 a perspective representation of the housing of the chain tensioner from FIG. 1, FIG. 4 a magnified perspective representation of the tensioning piston of the chain tensioner from FIG. 1, FIG. 5 a magnified perspective representation of the retainer element from FIG. 1, FIG. 6 the tensioning device from FIG. 1 at the beginning of the unlocking process, FIG. 7 a perspective representation of a section of the tensioning device during the unlocking process, FIG. 8 a side view of the tensioning device from FIG. 1 after the unlocking process, FIG. 9 a second embodiment of a chain tensioner according to the invention in a front view, FIG. 10 the chain tensioner from FIG. 9 cross-sectioned along the line X-X, FIG. 11 the housing of the chain tensioner from FIG. 9 in a perspective representation, FIG. 12 the housing from FIG. 11 in a full cross-section, FIG. 13 the piston of the chain tensioner from FIG. 9 in a full cross-section, FIG. 14 the retainer element from FIG. 9 in a magnified front view, FIG. 15 the retainer element from FIG. 14 in a back view, FIG. 16 the unlocking element from FIG. 9 in a magnified full cross-section, FIG. 17 the unlocking element from FIG. 16 in a half cross-section rotated by 90°, FIG. 18 the upper section of the chain tensioner before the unlocking in a magnified front view, FIG. 19 a magnified perspective representation of the state as in FIG. 18, FIG. 20 the upper section of the chain tensioner from FIG. 9 during the unlocking process in a magnified front view, FIG. 21 a perspective representation of the state as in FIG. 20, FIG. 22 the upper section of the chain tensioner from FIG. 9 after the unlocking in a magnified front view, and FIG. 23 the upper section of the chain tensioner in the state as in FIG. 22 in a magnified perspective representation (partially cross-sectioned).

FIG. 1 is a representation of the significant components making up a timing chain drive 1. This is comprised of a chain tensioner 2, a pivot bolt 3 around which a pivoting tensioning rail 4 is arranged, a guide rail 5, a timing chain 6 and—only shown schematically—the camshaft chain sprockets 7 and 8 and the crankshaft chain sprocket 9. The chain drive 1 couples the crankshaft (not shown) with the camshafts (not shown). The guide rail 5 is arranged in the driving side of the timing chain drive 1, whereas the tensioning rail 4 is pressed against the slack span of the timing chain drivel.

The chain tensioner 2 is an insert chain tensioner, the housing 10 of which is inserted into a corresponding receiver 11 on the engine block, which is not shown in detail. For this purpose, housing 10 has a fastening flange 12 with attachment bores 13 and a ring-shaped fully circumferential flange 14 that is arranged at a distance to these, the exterior surface of which has a ring groove 15 to accept an O-ring. The housing 10 furthermore has a tube-shaped section 17 extending vertically away from fastening flange 12 attached by means of a tab section 16, where this tube-shaped section 17 supports the flange 14 already mentioned above along its outer circumference. The tube-shaped section 17 is closed toward the fastening flange 12, thus forming a cylindrical receiver bore 18 with a closed base. The tube-shaped section 17 has a supply bore 19 between fastening flange 12 and flange 14, where said supply bore 19 creates a connection to the engine hydraulic systems. Housing 10 is inserted into receiver 11 and attached by means of attachment screws 20, which are inserted into fastening bores 13 and screwed into the receiver. For this purpose, a flange gasket is employed between fastening flange 12 and receiver 11, and an O-ring is inserted into ring groove 15, where neither the flange gasket nor the O-ring are shown in detail. This creates a sealed region within receiver 11 between fastening flange 12 and flange 14. A feed bore of the oil hydraulic system terminates in this region, so that oil can flow into the interior of receiver bore 18 by means of supply bore 19.

Two opposing stop protrusions 21 are located at a distance to flange 14 along the front end of housing 10. The front face of housing 10 has two protruding chamfered sections 22 that have a beveled stop edge 23. The chamfered sections 22 and stop edge 23 form sections of a circular shape that correspond to the shape of the tube-shaped section 17. For instance, if stop edge 23 were fully circumferential, it would form an internal taper.

Figure 4:
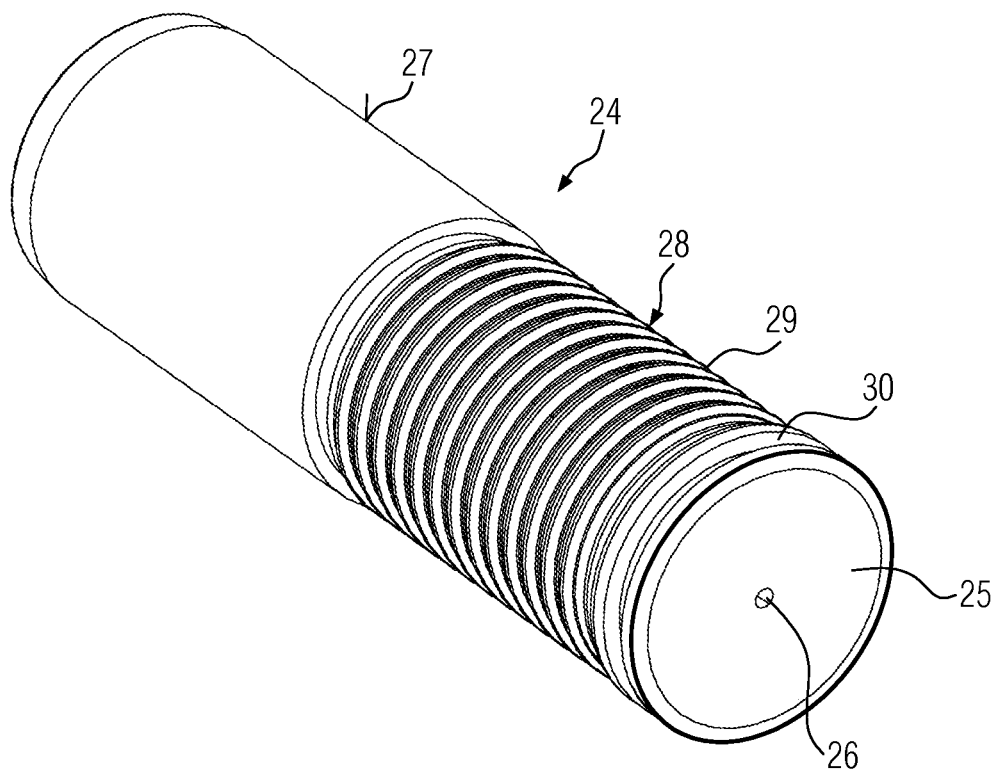

The tensioning piston 24 shown in FIG. 4 is inserted into receiver bore 18 in a longitudinally movable manner. The front section protrudes from housing 10 with front face 25. The tensioning piston 24 is configured as a hollow piston in the known manner. The interior of receiver bore 18 also contains a compression spring, which is not shown, and a mushroom shaped packing, which is forced by the compression spring against the base of a rear-facing bore opening in tensioning piston 24. These designs are already known, which is why they are not described in greater detail here. Furthermore, a check valve is arranged in the interior of housing 10 downstream from supply bore 19, where oil is able to flow through said check valve into, but not out of, housing 10. The tensioning piston 24 further has a vent bore 26 in front face 25, where said vent bore 26 is connected to the pressure reservoir (not shown) via choke grooves, where said pressure reservoir is formed between housing 10 and tensioning piston 24. For this purpose the rear section 27 of tensioning piston 24 is guided into receiver bore 18 with a sufficiently tight fit to merely create a leakage gap that is tuned for damping purposes. The tensioning piston 24 has a retainer profile 28 in the front section. The retainer profile 28 consists of adjacent, similarly configured, ring-shaped circumferential retainer grooves 29. A ring-shaped circumferential transport groove 30 is also located between retainer profile 28 and front face 25, where said transport groove 30 is deeper than retainer grooves 29 and has straight side flanks.

Figure 5:
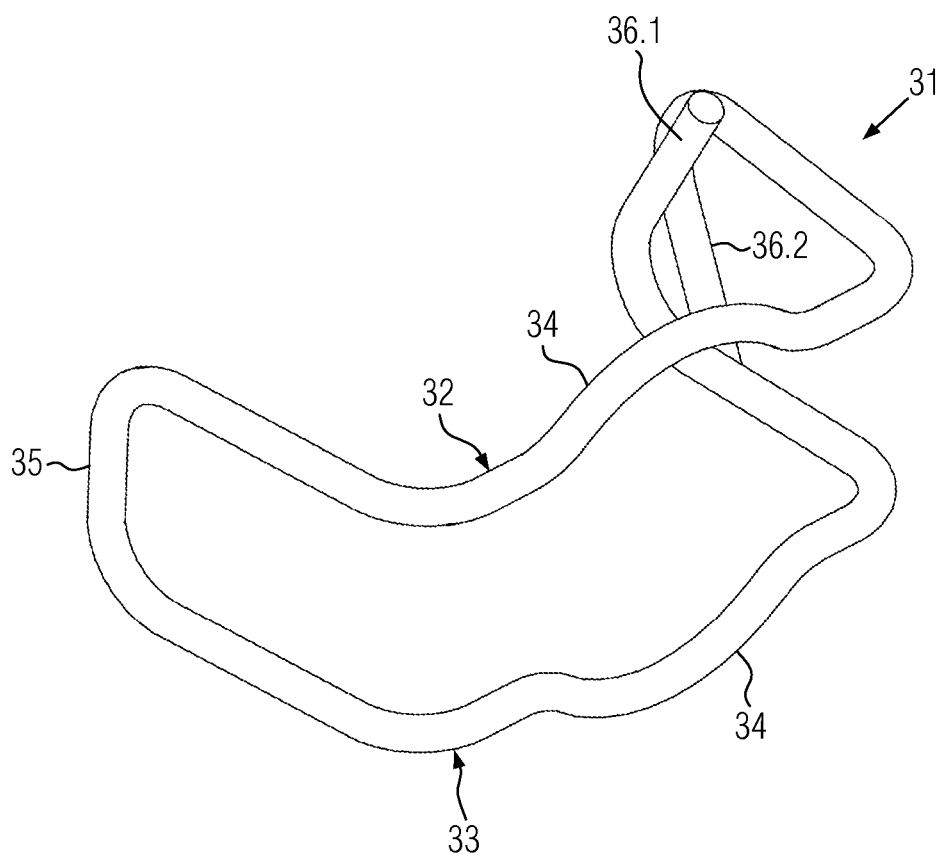

The retainer element 31 shown in FIG. 5 is also needed to create a transport locking device and an adjustment device. This retainer element 31 is designated as a retainer clamp bent from a round wire. Spring steel is preferably used for this purpose. The retainer element 31 has a first and second spring arm 32 and 33. Each of the two spring arms 32, 33 has an arched retainer section 34 at its center, where the arch shape of said arched retainer section 34 is adjusted to the radius of retainer grooves 29 and transport groove 30. The otherwise U-shaped spring arms 32 and 33 are connected to each other by means of a bar 35 on one side, whereas the open ends 36.1 and 36.2 on the opposite side are adjacent to each other and approximately imitate a bar.

The transport locking device furthermore comprises an unlocking element 37 arranged on tensioning rail 4, where said unlocking element 37 has the shape of a projecting tab and is equipped with ramp sections 38.1 and 38.2 on each of its opposing sides. The width of unlocking element 37 is selected such that its ramp sections 38.1 and 38.2, which form a chevron, can be inserted between the two spring arms 32 and 33 of retainer element 31 arranged on the tensioning piston 24 in order to spread apart said spring arms 32 and 33. The positioning on the backside of tensioning rail 4 is performed such that this interaction between unlocking element 37 and retainer element 31 can occur when tensioning rail 4 pivots around pivot bolt 3 and chain tensioner 2 is located in receiver 11. The tensioning rail 4 furthermore has a push contact surface 39 on its rear side that is intended to come into contact with front face 25 of tensioning piston 24.

The following provides a more detailed explanation of the operation and function of the embodiment shown.

Figure 2:
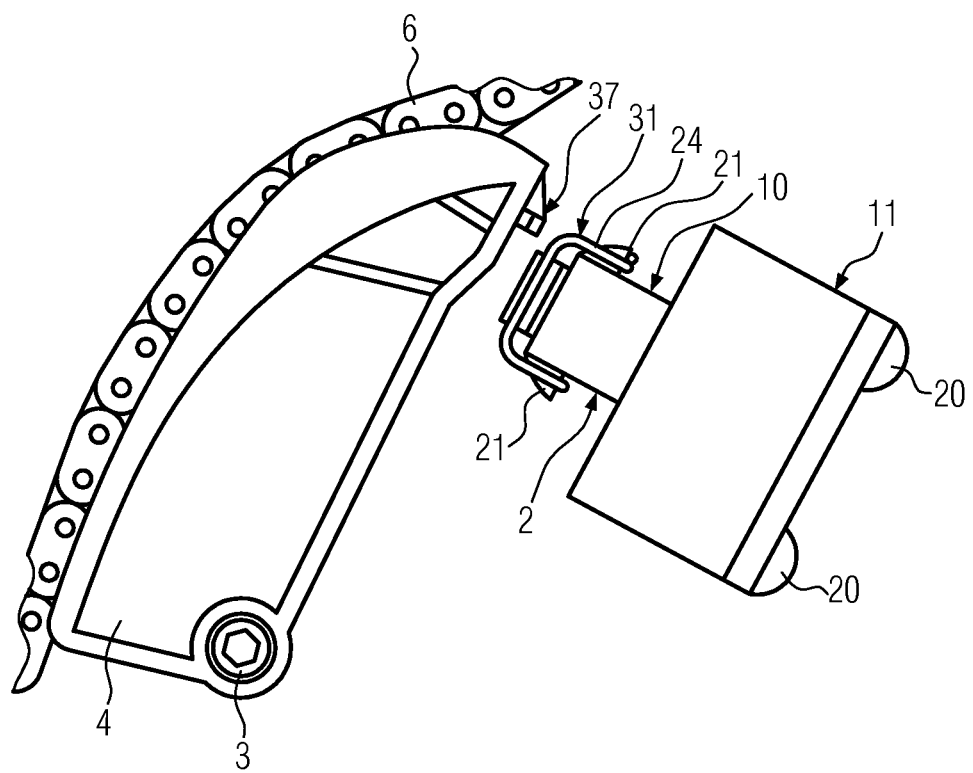
Figure 3:
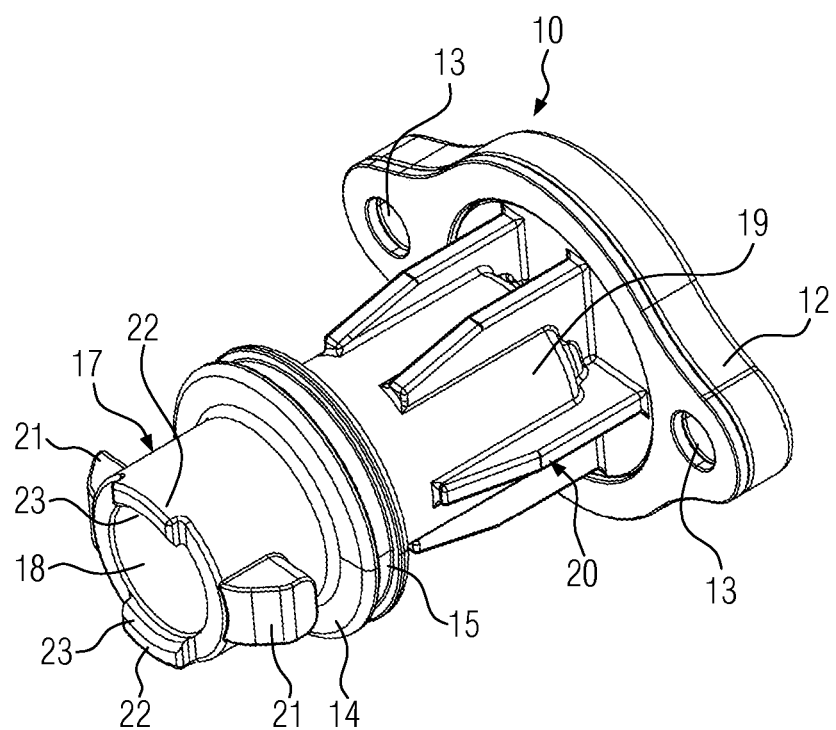
Figure 6:
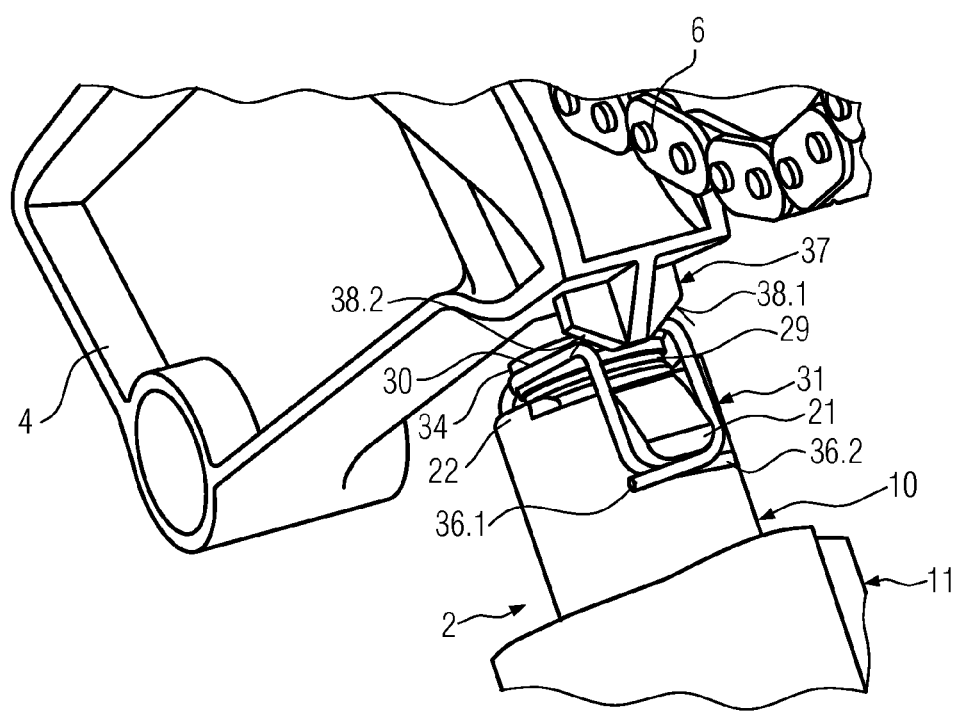

In the initial state, as is shown for instance in FIG. 2 and FIG. 6, the chain tensioner 2 is in its transport state. In this transport state, the tensioning piston 24 is retracted very far, so that retainer element 31 arranged on the outside of housing 10 engages into transport groove 30 using its retainer sections 34, supporting itself on the opposite side on the bottom sides of stop protrusions 21 using bar 35 and also the open ends 36.1 and 36.2. Due to the straight side surfaces of transport groove 30, the compression spring (not shown) preloaded in the interior of chain tensioner 2 is unable to force out tensioning piston 24 against the resistance of retainer element 31, but instead, the already mentioned securing of the transport state is achieved.

Figure 7:
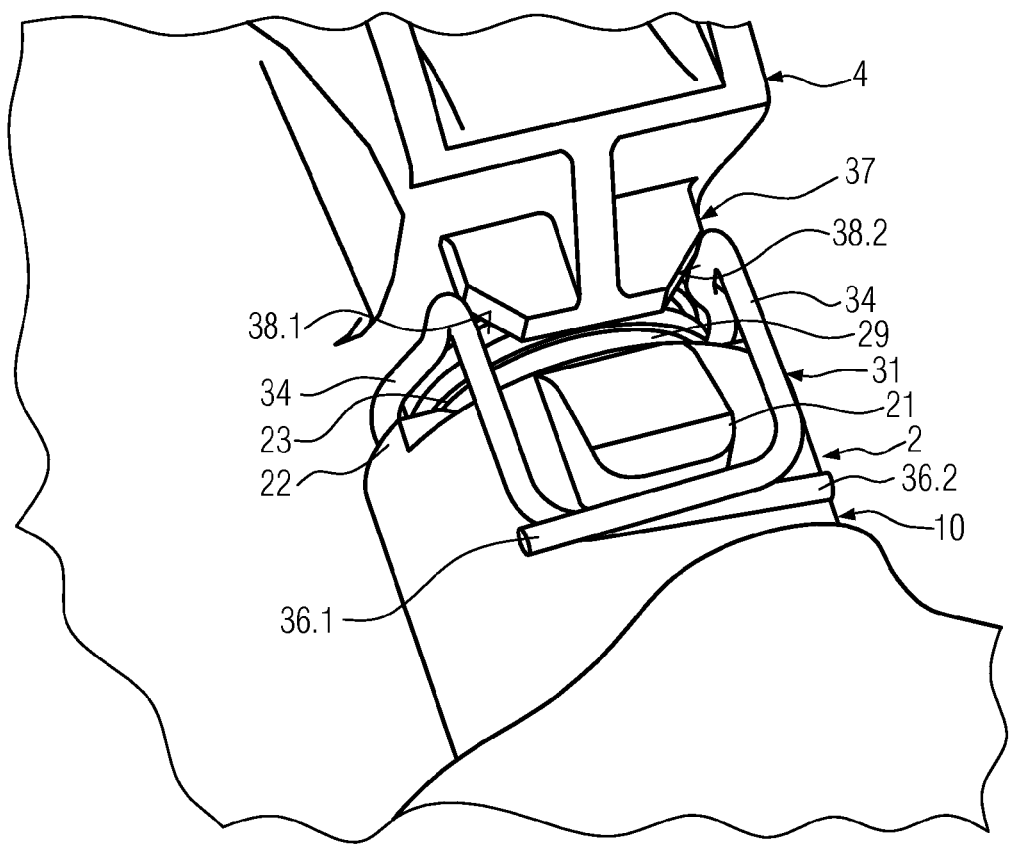
Figure 8:
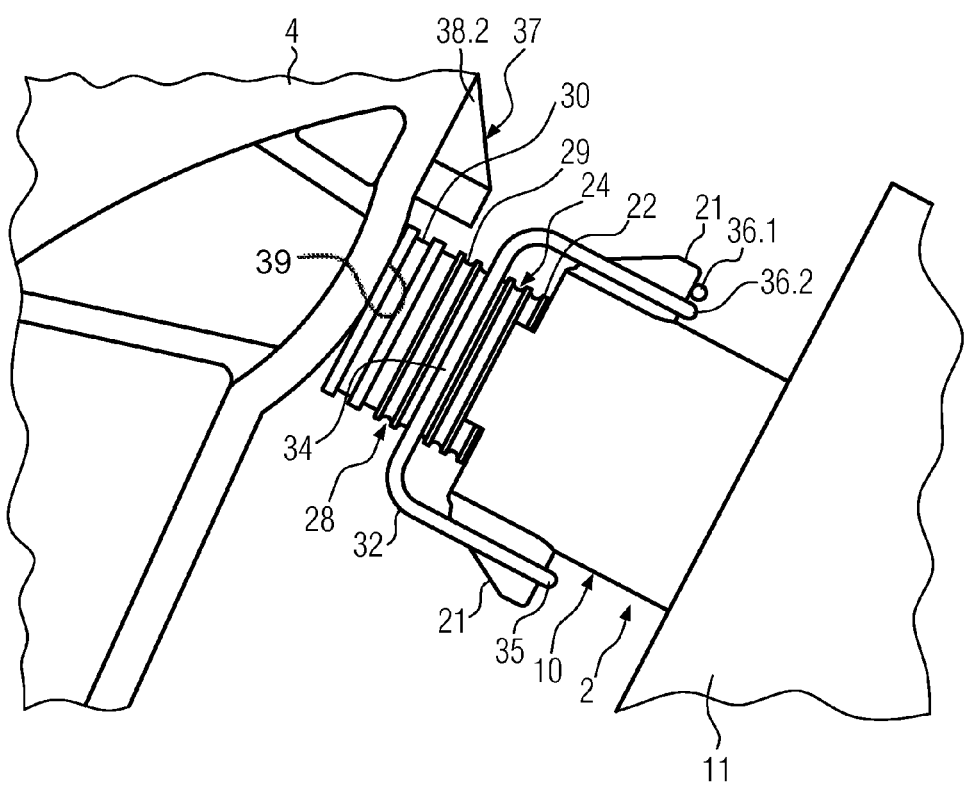

When tensioning rail 4 now pivots in a clockwise direction according to FIG. 2, unlocking element 37 is inserted between the two spring arms 32 and 33, specifically on the side where the two open ends 36.1 and 36.2 lie on top of each other, so that ramp sections 38.1 and 38.2 press against the respective spring arm 32 and 33 (see FIG. 7). This causes spring arms 32, 33 to move away from each other, spreading apart retainer element 31. This in turn causes retainer sections 34 to slide out from transport groove 30. Unlocking occurs as soon as the force of the compression spring acting in the interior is large enough, and tensioning piston 24 disengages and propels from housing 10 and in between spring arms 32 and 33. As soon as front face 25 of tensioning piston 24 comes into contact with push contact area 39, the tensioning piston 24 propelling to the outside also forces tensioning rail 4 back in the opposite direction, that is to say in a counter-clockwise direction. In this way, the tensioning piston 24 causes unlocking element 37 to be carried along as well and thus to be moved out of the area between the two spring arms 32 and 33, also causing ramp sections 38.1 and 38.2 to no longer be in functional contact with spring arms 32 and 33. This ends the spreading apart of retainer element 31, and as soon as an equilibrium has been established between the compression spring in the interior of chain tensioner 2 and the force of timing chain 6 acting against tensioning rail 4, retainer sections 34 engage into the retainer groove 29 of retainer profile 28 located at the same height. This state is represented in FIG. 8. In this case the retainer mechanism engages into the third retainer groove 29 of retainer profile 28 for illustration purposes. The push contact area 39 therefore essentially functions as an entrainment device for unlocking element 37, causing it to disengage from retainer element 31.

This design also provides an adjustment device in addition to the transport locking device. The retainer element 31 is shaped in such a manner that a working range is defined between the contact of retainer sections 34 and stop edges 23 when tensioning piston 24 retracts, and the contact of bar 35 and open ends 36.1 and 36.2 along the bottom side of stop protrusions 21 when tensioning piston 24 deploys. The travel distance that tensioning piston 24 can travel within the working range is slightly larger than the center-to-center distance between two retainer grooves 29. Within this range, retainer element 31 moves together with tensioning piston 24 and has no further effect. But as soon as an adjustment is needed because tensioning piston 24 deploys further, e.g. due to wear (lengthening) of timing chain 6, bar 35 as well as open ends 36.1 and 36.2 contact the bottom side of stop protrusions 21. But the hydraulic pressure in the interior of chain tensioner 2 is so large that tensioning piston 24 is forced further to the outside. Due to the round shape of retainer grooves 29, retainer element 31 can spread apart, so that spring arms 32 and 33 are forced to the outside, allowing retainer sections 34 to engage into the next adjacent retainer groove 29 after a corresponding travel distance of tensioning piston 24, causing an adjustment to the working range. In addition to this further deployment of tensioning piston 24, which retainer element 31 does not oppose, retainer element 31 also performs the arresting function in the opposite direction. When large vibration movements occur in timing chain drive 1, such as occur during the starting process of the internal combustion engine, the retraction motion of tensioning piston 24 is limited by retainer element 31. In particular during the startup process and due to the leakage gap seal between housing 10 and tensioning piston 24, sufficient hydraulic pressure has not yet developed in the interior of the pressure reservoir at engine startup, therefore resulting in insufficient damping. In this state, when tensioning piston 24 retracts against the spring force, retainer element 31 comes into contact with chamfered sections 22 on housing 10 after a corresponding retraction motion. This specifically applies for retainer sections 34, which come into contact with the beveled stop edges 23. Due to the beveled configuration of stop edges 23, retainer sections 34 are forced in the direction of tensioning piston 24, preventing retainer sections 34 from sliding out of the corresponding retainer groove 29. This prevents tensioning piston 24 from retracting beyond the working range. The chain tensioner 2 is therefore equipped with an adjustment device that adjusts to the wear state of the chain drive.

FIG. 9 to 23 are employed to explain a second embodiment of the present invention as follows. When pertinent, the same reference numbers are used for the same and functionally equivalent components and reference is made in this regard to the above description. The following is strictly intended to make reference to the significant differences to the aforementioned exemplary embodiment. The chain tensioner 2 shown in FIGS. 9 and 10 can be employed in a functionally equivalent manner with the other elements of the timing chain drive 1 shown in FIG. 1. Only the unlocking element 37 arranged on tensioning rail 4 is omitted and is replaced by a different design described below.

Figure 9:
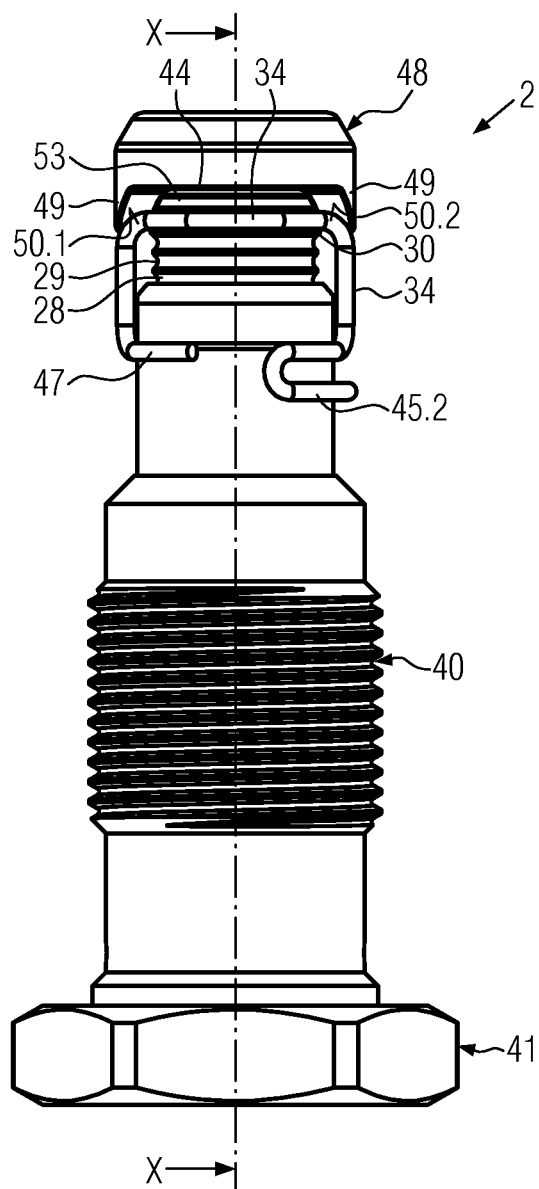
Figure 10:
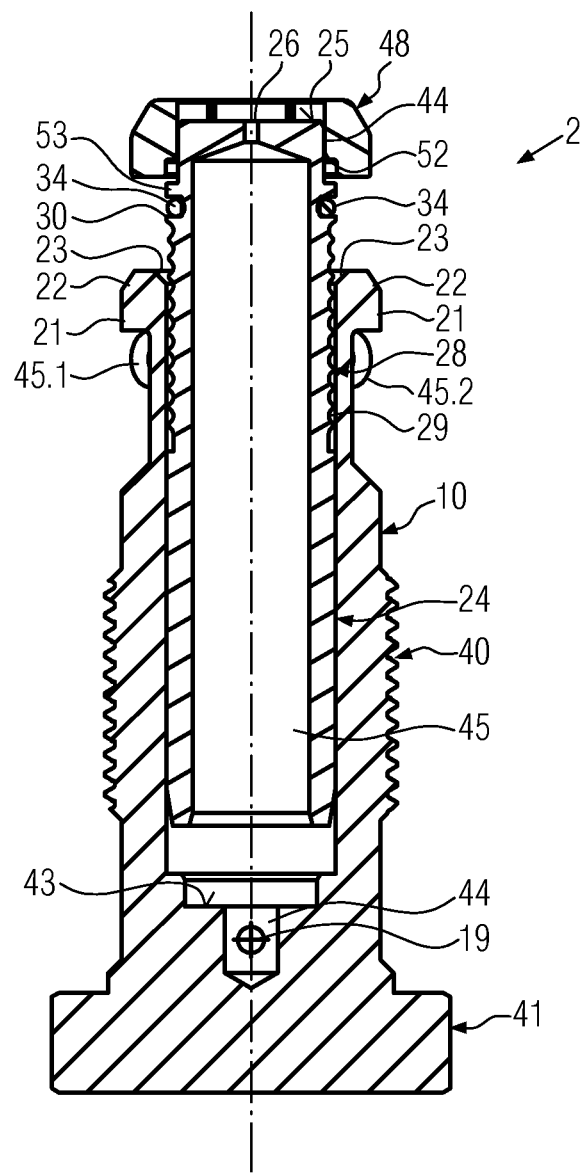
Figure 11:
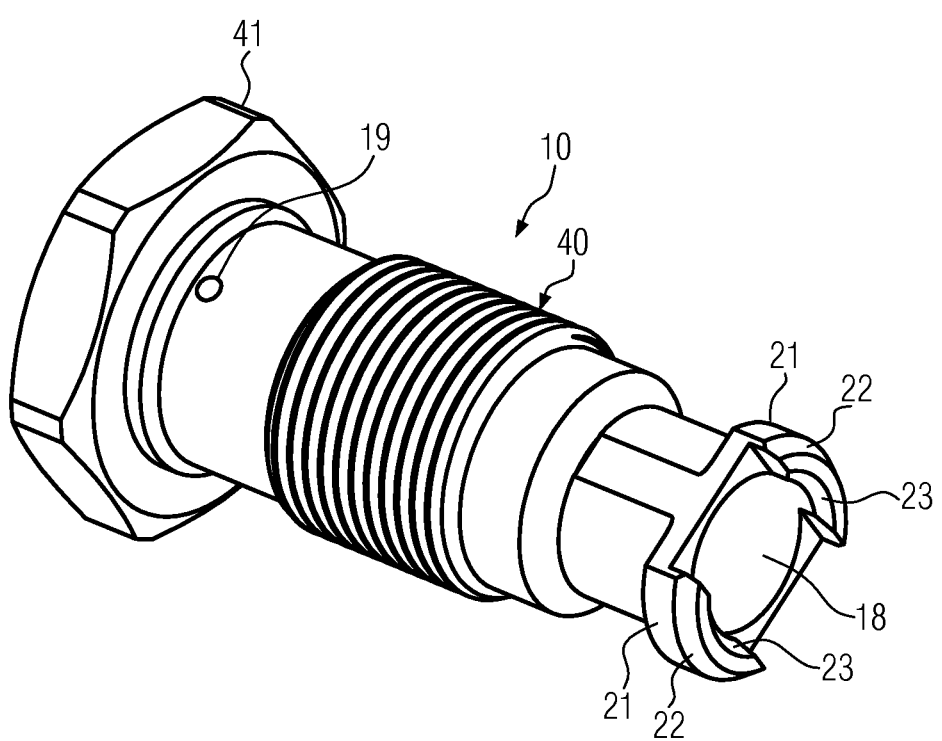
Figure 12:
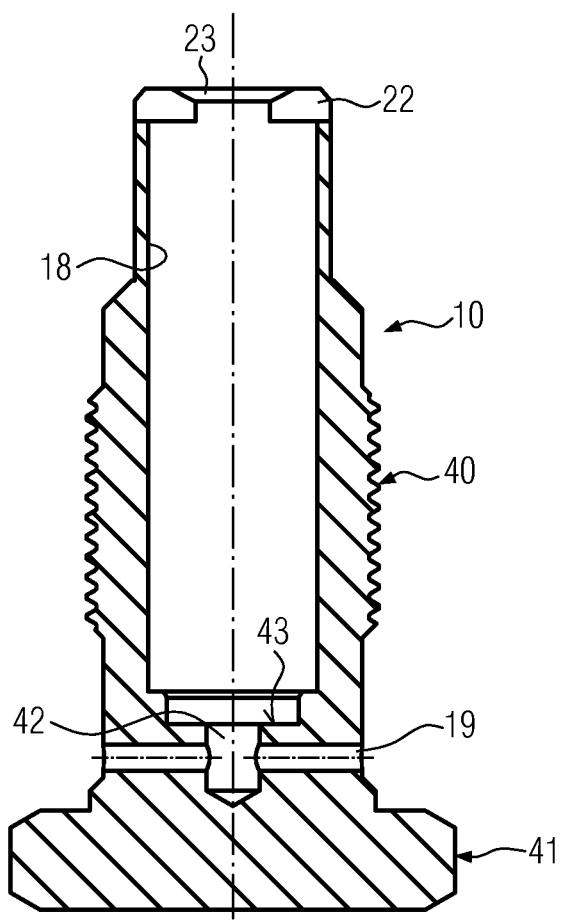
Figure 13:
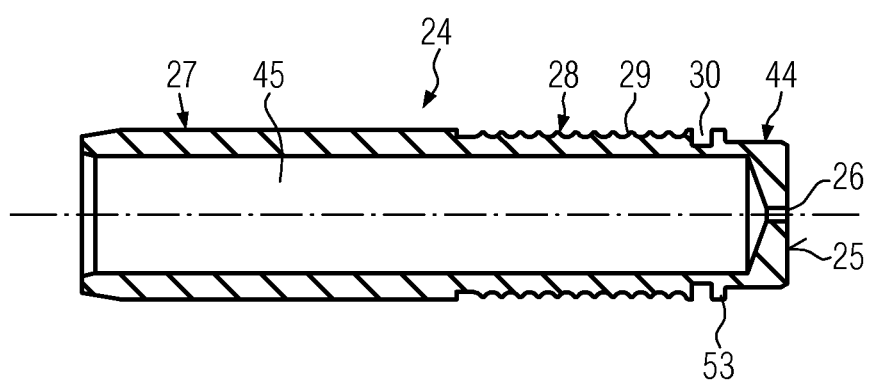
Figure 14:
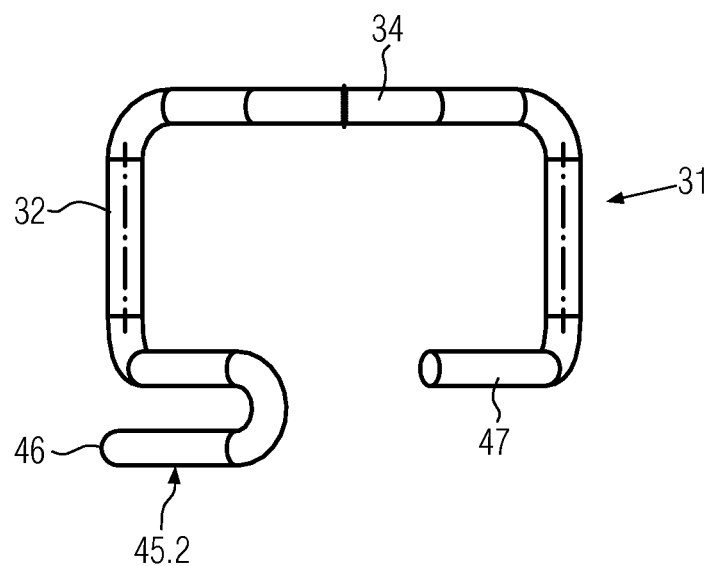
Figure 15:
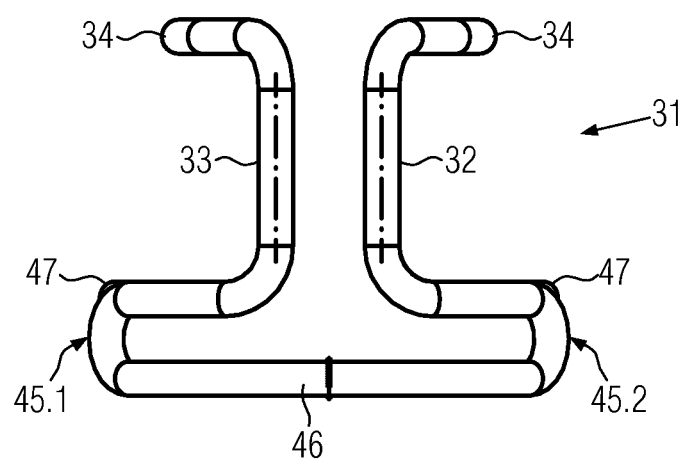
Figure 16:
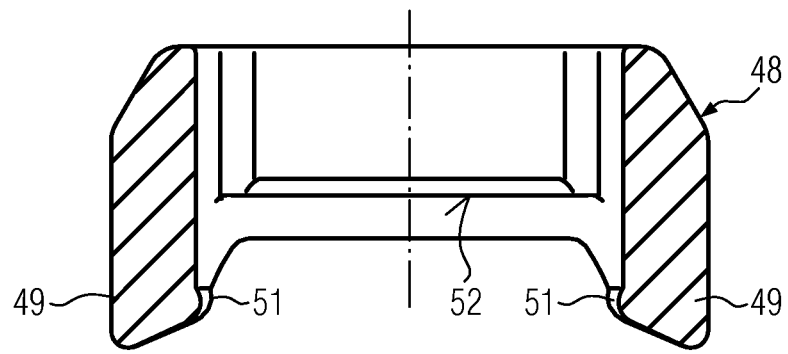
Figure 17:
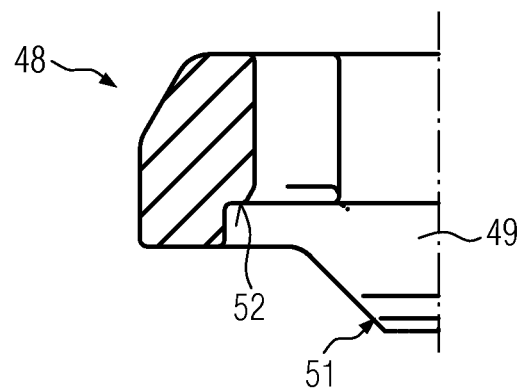

The chain tensioner 2 shown in FIGS. 9 and 10 has a housing 10 (see also FIGS. 11 and 12), which is configured as a screw-in housing. For this purpose, housing 10 is screwed into a bore (not shown) in the engine block. This engine block bore has a feed bore to provide a connection to the engine oil hydraulic system. This feed bore communicates with a section that is located between threaded section 40 and hex head 41 of housing 10. This section contains supply bore 19 extending radially to the outside, which is in contact with receiver bore 18 via a central connection bore 42. A receiver pocket 43 is located at the base of receiver bore 18, which serves to seat a check valve that is not shown. A gasket is inserted between hex head 41 and the engine block, so that a reliable fluid connection is provided between the engine oil hydraulic system and chain tensioner 2. The shape of tensioning piston 24 essentially corresponds to the tensioning piston of the aforementioned embodiment. The tensioning piston 24 is only extended slightly above transport groove 30, and has a cylindrical extension 44 with a slightly smaller diameter. The interior structure and configuration as a hollow piston is also essentially equivalent in shape to the aforementioned embodiment. For reasons of simplification, the check valve as well as the compression spring and the packing have been omitted from FIG. 10. For the largest portion, or all of their lengths, these are located within the hollow space 45 inside tensioning piston 24.

The stop protrusions 21 are configured slightly larger in this embodiment and shaped together with chamfered sections 22, so that these respectively form a ring section.

The retainer element 31, which is arranged on the outside of housing 10 and is engaged with tensioning piston 24, is in turn bent from a round wire and is shaped slightly differently from the first embodiment because of the fact that stop protrusions 21 and chamfered sections 22 are located on top of each other. The spring arms 32 and 33 and retainer sections 34 are essentially identical. In place of bar 35, spring arms 32 and 33 are connected to each other on one side by means of stop tabs 45.1 and 45.2, which partially encompass housing 10 and have a common tab 46. Stop tabs 47 are arranged on the opposite side on the applicable ends of spring arms 32 and 33, where said stop tabs 47 each partially encompass housing 10. The upper lip of stop tabs 45.1 and 45.2 and of stop arms 47 are at the same height.

Figure 18:
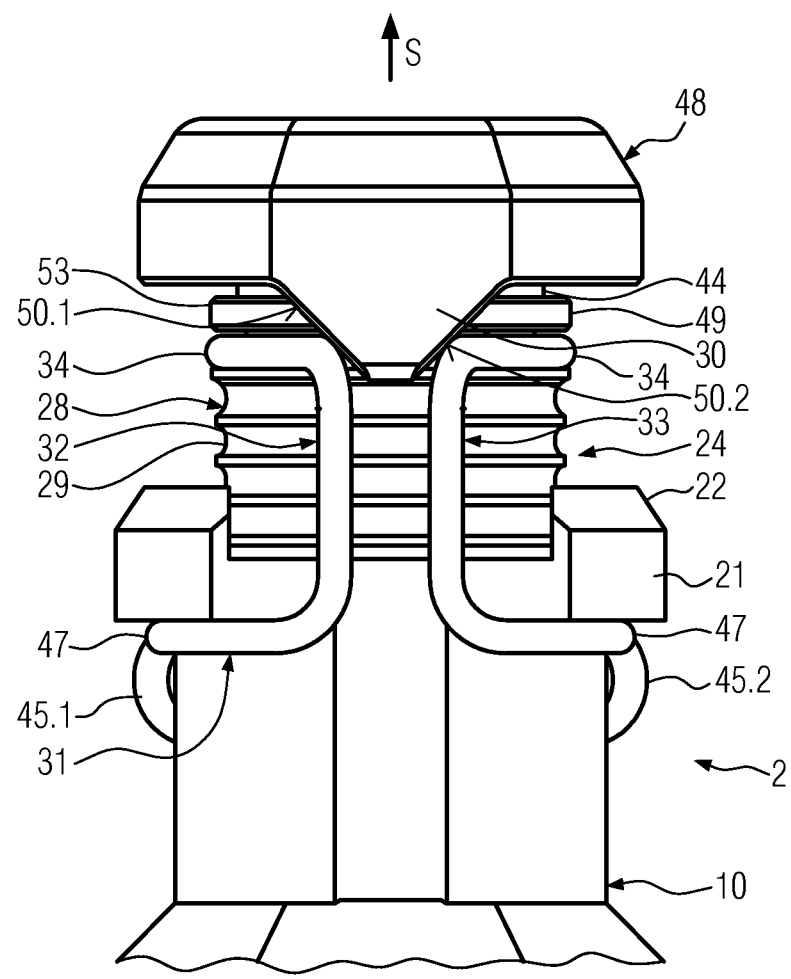

In the transport state shown in FIGS. 9 and 18, retainer sections 34 of spring arms 32 and 33 are engaged into transport groove 30 of tensioning piston 24 and the upper lips of stop tabs 45.1 and 45.2 and stop arms 47 are located on the bottom side of stop protrusions 21. This secures tensioning piston 24 in the transport state.

Unlocking is performed by an unlocking element 48 in the shape of a ring-shaped cap located on extension 44 of tensioning piston 24. The ring-shaped unlocking element 48 has two diametrically arranged spreader arms 49 that are parallel to the axis and located on the bottom side. Each spreader arm 49 has a ramp section 50.1 and 50.2, respectively on its outward pointing sides. This creates a chevron that can be inserted into the area between the two spring arms 32 and 33 and spread these apart. Inward protruding retainer tabs 51 are located on the lower end of spreader arms 49, where the shape of said retainer tabs 51 is selected in a manner permitting these to engage into transport groove 30 and to also engage into retainer groove 29 located below transport groove 30. The unlocking element 48 is designed to be movable by precisely this amount along extension 44 relative to tensioning piston 24. The entrainment device is formed by a stop shoulder 52 in the opening of the ring-shaped unlocking element 48 and a stop flange 53 correspondingly located above transport groove 30. Longitudinal grooves 54, which are associated with spreader arm 49, are located in unlocking element 48, where said longitudinal grooves 54 facilitate the injection molding process and also provide for improved flexibility of spreader arms 49.

FIG. 18 to 23 are now employed to explain the operation and function of this embodiment as follows.

Figure 19:
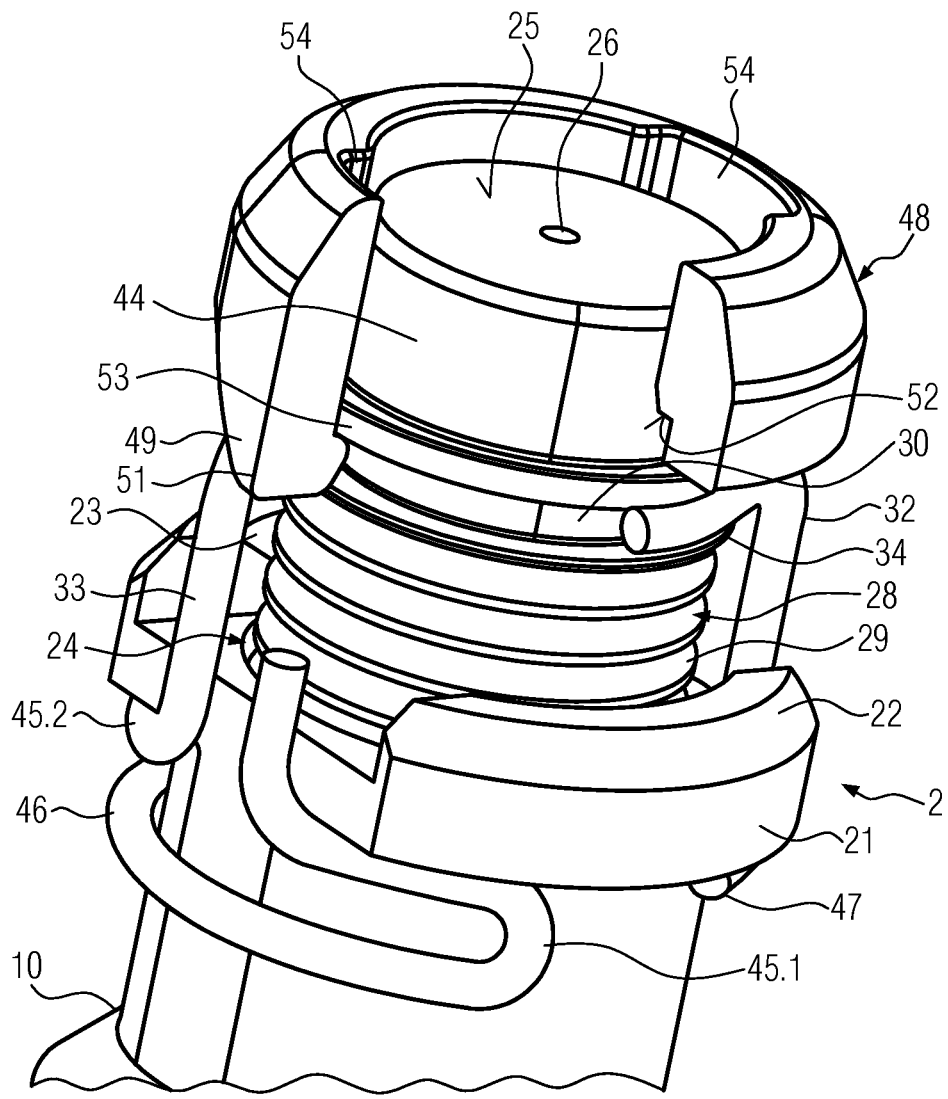

FIGS. 18 and 19 are representations of the transport state, in which retainer element 31 is engaged into transport groove 30 and unlocking element 48 also engages into transport groove 30 between the two spring arms 32 and 33 using retainer tabs 51. This locates stop shoulder 52 at a distance to stop flange 53 that essentially corresponds to the center-to-center distance between transport groove 30 and the uppermost retainer groove 29.

Figure 20:
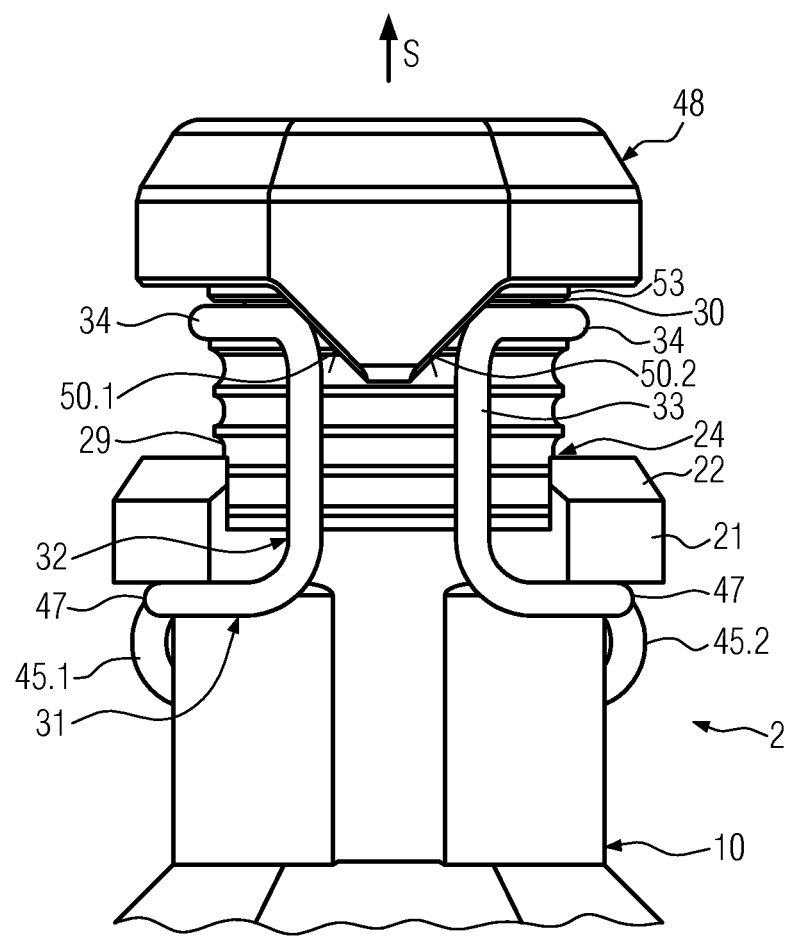
Figure 21:
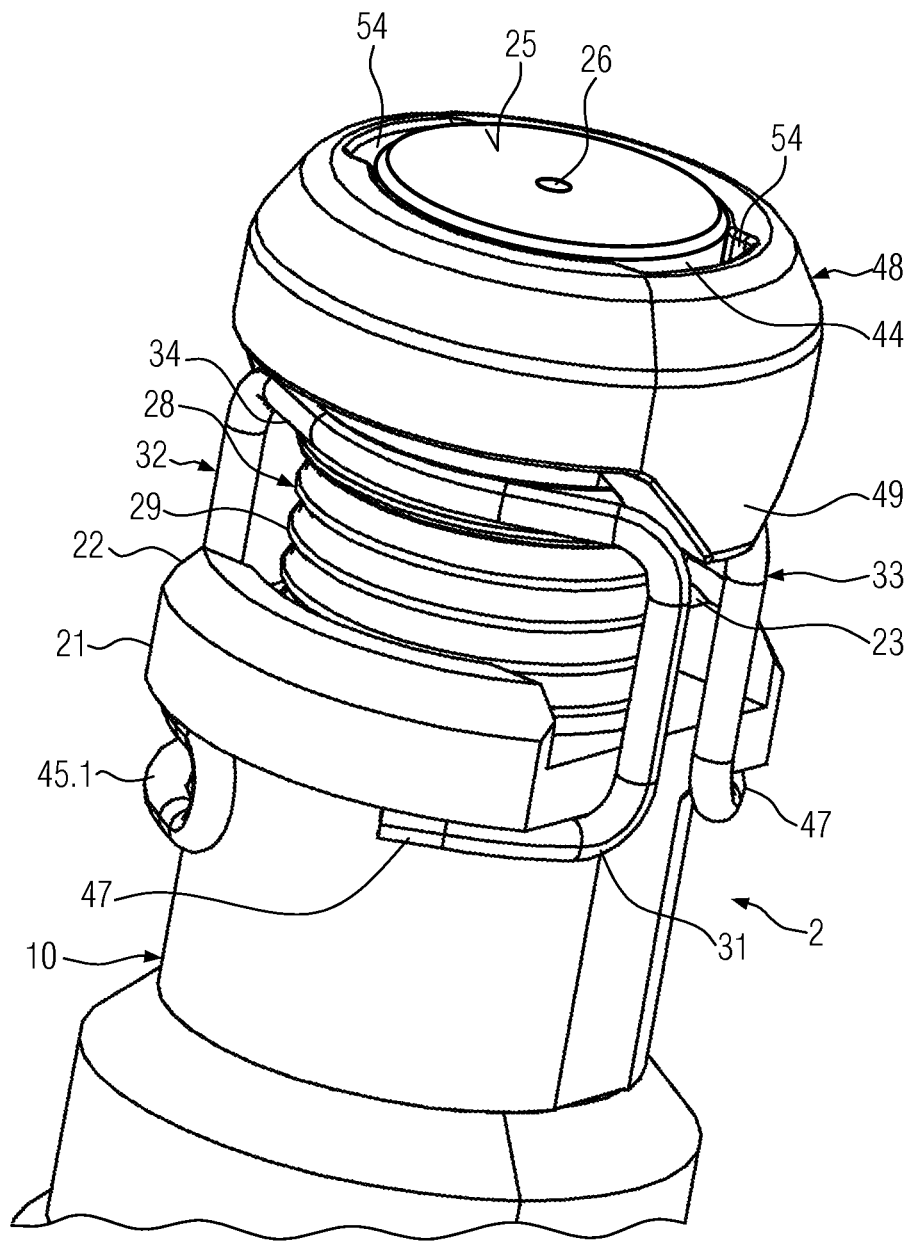
Figure 22:
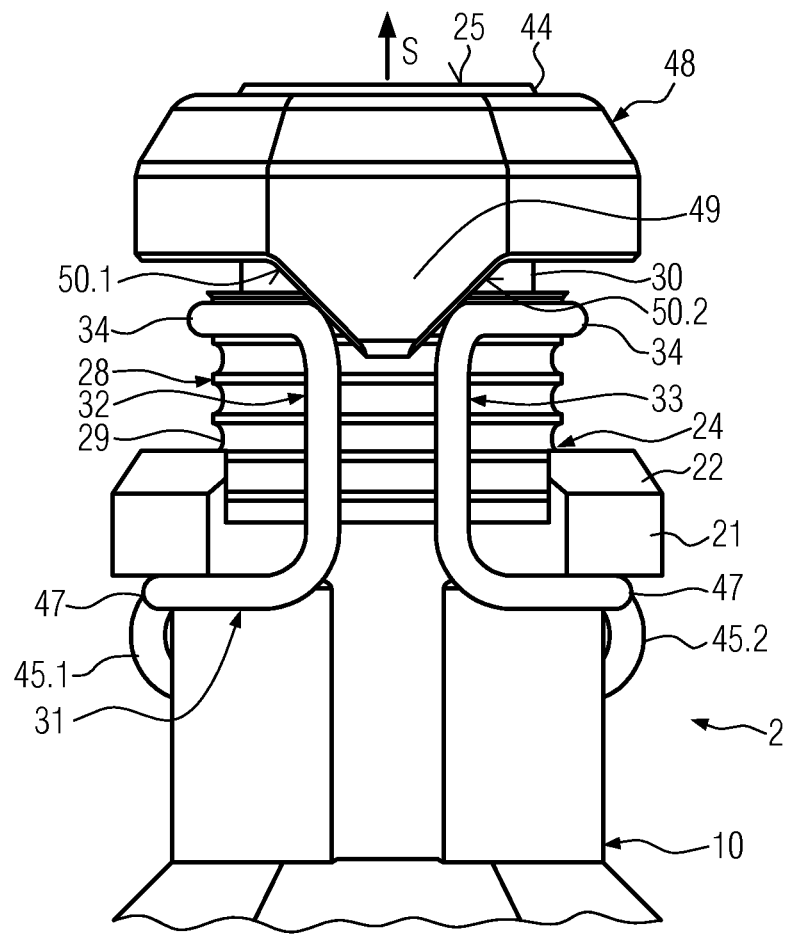
Figure 23:
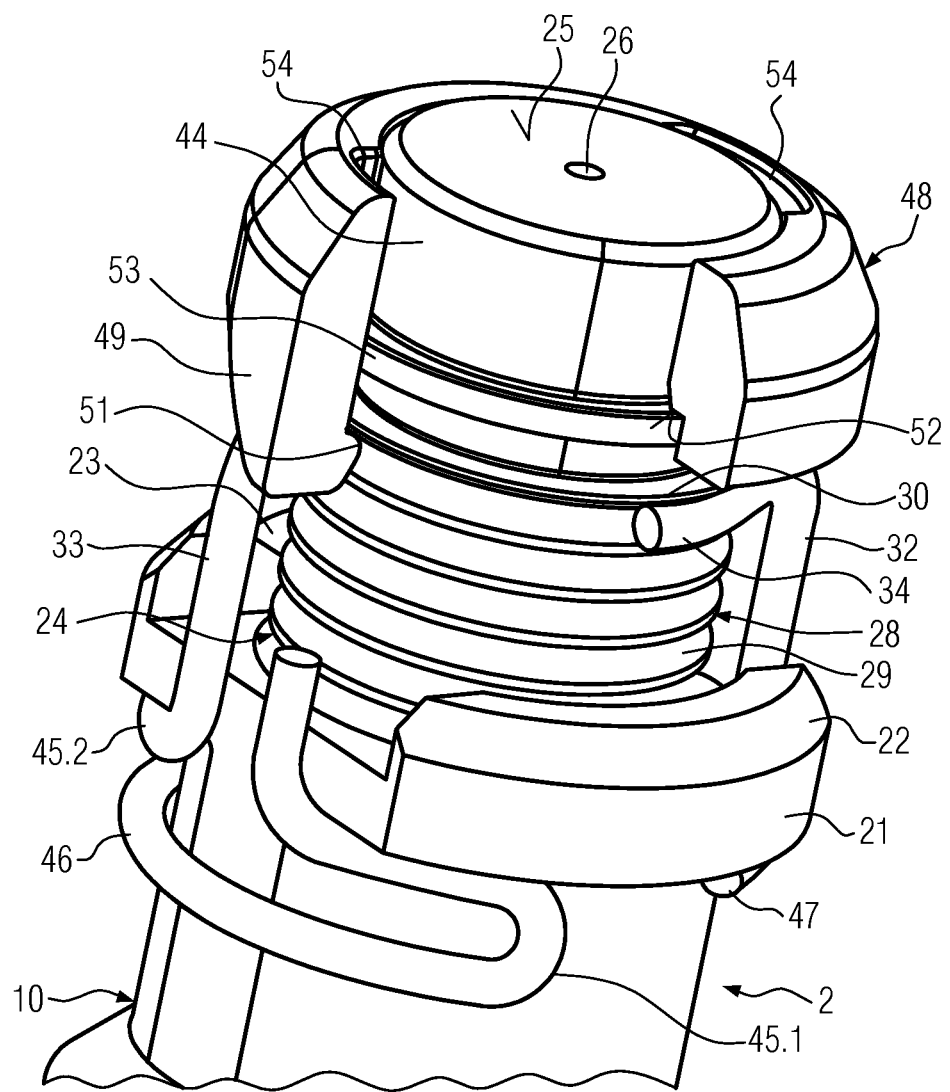

In order to unlock the transport state, chain tensioner 2 is now screwed into the engine block by means of its screw-in housing 10. Due to the unlocking element 48 protruding past front face 25, unlocking element 48 first comes into contact with push contact surface 39 of tensioning rail 4. Push contact surface 49 of tensioning rail 4 and the front face of unlocking element 48 are shaped accordingly. Due to the increasing pressure created by the screw-in process, tensioning rail 4 now exerts an increasingly greater force on unlocking element 48, until the correspondingly shaped retainer tab 51 glides out of transport groove 30. For this purpose, retainer tab 51 has a downward facing, flat ramp section that facilitates this gliding out process. Moreover, spreader arms 49 are equipped with sufficient flexibility, so that this may be attained with adequate force. As soon as the unlocking of retainer tabs 51 has been accomplished, unlocking element 48 slides relative to tensioning piston 24 along extension 44. As can be seen in FIGS. 20 and 21, ramp sections 50.1 and 50.2 come into contact with spring arms 32 and 33 during this process and force these to the outside, so that retainer element 31 is spread apart until retainer sections 34 disengage from transport groove 30, releasing tensioning piston 24. Due to the spring force of the compression spring arranged in the interior of chain tensioner 2, tensioning piston 24 is subsequently propelled upward and also performs a relative motion to unlocking element 48 due to mass inertia. This relative motion accomplishes a stop contact of stop flange 53 with stop shoulder 52 of unlocking element 48, subsequently causing unlocking element 48 to be carried along by tensioning piston 24, so that spreader arms 49 are again retracted from the area between spring arms 32 and 33, and ramp sections 50.1 and 50.2 are no longer engaged with spring arms 32 and 33. Retainer tabs 51 engage in the uppermost retainer groove 29 coterminous with the stop contact of stop flange 53 on stop shoulder 52, so that unlocking element 48 is secured in this state, e.g. does not cause noise during operation. The relative motion between tensioning piston 24 and unlocking element 48 until the stop contact with stop shoulder 52 is selected such that tensioning piston 24 protrudes slightly from unlocking element 48 in the final state of the tensioning piston (as can be specifically seen in FIG. 22), so that only front face 25 of tensioning piston 24 is in contact with the push contact area 39 of tensioning rail 4.

In addition to this automatic unlocking of tensioning piston 24 from the transport state, this embodiment also provides an adjustment device. In this embodiment, the working range is slightly larger and extends approximately for the heights of three adjacent retainer grooves 29. As can be seen e.g. in FIG. 22, retainer element 41 is initially engaged with the uppermost retainer groove 29. The upper lips of stop tabs 45.1 and 45.2 come into contact with the bottom side of stop protrusions 21, thus limiting the upward travel or forward motion in tensioning direction S of tensioning piston 24. Starting from this state, as soon as chain wear permits tensioning piston 24 to deploy further, the groove shape of retainer grooves 29 causes spring arms 32 and 33 to spread toward the outside, and, because consistent wear is assumed, to snap into the next lower retainer groove 29. A blockage of a further retraction motion of tensioning piston 24 beyond the working range occurs in the opposite direction. For this purpose, chamfered sections 22 are in turn equipped with beveled stop edges 23, onto which retainer sections 34 of spring arms 32 and 33 make a stop contact when tensioning piston 24 performs a retraction motion. Here as well, the beveled stop edges 23 cause retainer sections 34 to be forced in the direction of tensioning piston 24, thus preventing a sliding out of the respective retainer groove 29 and therefore blocking a further retraction motion of tensioning piston 24.

The invention claimed is:

1. A tensioning device for an endless drive device comprising a tensioning rail and a housing with a spring loadable tensioning piston guided in a sliding manner in a receiving bore of the housing, an adjustment device to adjust a working range of the tensioning piston, a transport locking device, wherein the adjustment device comprises a retainer element arranged on the housing having a first spring arm and a retainer profile arranged in the forward section of the tensioning piston in a tensioning direction, wherein the transport locking device comprises a transport groove in the tensioning piston, the first spring arm of the retainer element can be engaged with the transport groove, and an unlocking element, wherein the unlocking element is part of the tensioning rail and has a first ramp section that can be brought into functional contact with the first spring arm, where said first ramp section exerts an unlocking force over a predefined travel path of the unlocking element on said first spring arm relative to the tensioning piston, forcing said first spring arm out of the transport groove.

2. A tensioning device in accordance with claim 1, wherein the unlocking element has an entrainment device that can be brought into functional contact with the tensioning piston that is configured and positioned in such a manner that the entrainment device is brought into functional contact with the deploying tensioning piston after the spring arm disengages from the transport groove, the tensioning piston carries along the unlocking element, and the ramp section is therefore brought out of functional contact with the spring arm of the retainer element and engages into a retainer profile.

3. A tensioning device in accordance with claim 1, wherein the retainer element includes a second spring arm, the first spring arm and the second spring arm opposing each other and having a clamp-like function, and wherein the unlocking element includes a second ramp section, the first ramp section and the second ramp section configured to be inserted between the first spring arm and the second spring arm, thus causing the first and second spring arms to be spread apart and to disengage from transport groove.

4. A tensioning device in accordance with claim 1, wherein the retainer element is formed by a bent round wire clamp, the first spring arm of which is connected by means of a stop tab that at least partially encompasses the housing, where said stop tab can be brought into functional contact on the housing by means of a stop protrusion in order to adjust the working range.

5. A tensioning device in accordance with claim 1, wherein the first spring arm engaged with the retainer profile protrudes radially in such a manner that the first spring arm can be brought into contact at a retraction travel end of the working range with a stop surface on the housing when the tensioning piston retracts, thus preventing a further retraction motion of the tensioning piston.

6. A tensioning device in accordance with claim 2, wherein the entrainment device is formed by a push contact surface of the tensioning rail that comes into functional contact with a front face of the tensioning piston.

7. A chain drive, specifically a timing or auxiliary device drive for an internal combustion engine, having a drive chain sprocket, at least one driven chain sprocket, a drive chain coupling the drive chain sprocket and the at least one driven chain sprocket with each other, and a tensioning device in accordance with claim 1 for tensioning the drive chain.

* * * * *